(12) United States Patent
Hillis

(10) Patent No.: US 8,139,043 B2
(45) Date of Patent: *Mar. 20, 2012

(54) BOUNDING BOX GESTURE RECOGNITION ON A TOUCH DETECTING INTERACTIVE DISPLAY

(75) Inventor: W. Daniel Hillis, Encino, CA (US)

(73) Assignee: Touchtable, Inc., Pasadena, CA (US)

( * ) Notice: Subject to any disclaimer, the term of this patent is extended or adjusted under 35 U.S.C. 154(b) by 29 days.

This patent is subject to a terminal disclaimer.

(21) Appl. No.: 12/615,224

(22) Filed: Nov. 9, 2009

(65) Prior Publication Data

US 2010/0117979 A1 May 13, 2010

Related U.S. Application Data

(63) Continuation of application No. 11/134,802, filed on May 20, 2005, now Pat. No. 7,719,523, which is a continuation-in-part of application No. 10/913,105, filed on Aug. 6, 2004, now Pat. No. 7,728,821.

(60) Provisional application No. 60/647,343, filed on Jan. 25, 2005.

(51) Int. Cl.
*G06F 3/041* (2006.01)
(52) U.S. Cl. ........................................ 345/173; 715/863
(58) Field of Classification Search .......... 345/173–178; 178/18.01–18.11; 715/863; 382/181, 182, 382/184, 187, 189
See application file for complete search history.

(56) References Cited

U.S. PATENT DOCUMENTS

| | | | |
|---|---|---|---|
| 3,478,220 A | 11/1969 | Milroy |
| 3,673,327 A | 6/1972 | Johnson |
| 3,764,813 A | 10/1973 | Clement |
| 3,775,560 A | 11/1973 | Ebeling |

(Continued)

FOREIGN PATENT DOCUMENTS

EP 0881591 B1 12/1998

(Continued)

OTHER PUBLICATIONS

Diamond Touch Applications; Mitsubishi Electric Research Laboratories, Aug. 2, 2004.

(Continued)

*Primary Examiner* — Jimmy H Nguyen
(74) *Attorney, Agent, or Firm* — Michael A. Glenn; Glenn Patent Group

(57) ABSTRACT

The invention provides a method and apparatus for identifying gestures performed by a user to control an interactive display. The gestures are identified based on a bounding box enclosing the points at which a user contacts a touch sensor corresponding with the display surface. The invention thus permits the use of inexpensive and highly reliable grid-based touch sensors that provide a bounding box to describe contact information. In identifying the gestures, the position, motion, shape, and deformation of the bounding box may all be considered. In particular, the center, width, height, aspect ratio, length of the diagonal, and orientation of the diagonal of the bounding box may be determined. A stretch factor, defined as the maximum of the ratio of the height of the bounding box to the width of the bounding box and the ratio of the width of the bounding box to the height of the bounding box, may also be computed. Finally, gestures may be identified based on the changes in time of these characteristics and quantities.

21 Claims, 2 Drawing Sheets

U.S. PATENT DOCUMENTS

| | | | |
|---|---|---|---|
| 3,860,754 | A | 1/1975 | Johnson |
| 4,144,449 | A | 3/1979 | Funk |
| 4,247,767 | A | 1/1981 | O'Brien |
| 4,463,380 | A | 7/1984 | Hooks, Jr. |
| 4,507,557 | A | 3/1985 | Tsikos |
| 4,517,559 | A | 5/1985 | Deitch |
| 4,722,053 | A | 1/1988 | Dubno |
| 4,742,221 | A | 5/1988 | Sasaki |
| 4,746,770 | A | 5/1988 | McAvinney |
| 4,782,328 | A | 11/1988 | Denlinger |
| 5,105,186 | A | 4/1992 | May |
| 5,239,373 | A | 8/1993 | Tang et al. |
| 5,436,639 | A | 7/1995 | Arai et al. |
| 5,448,263 | A | 9/1995 | Martin |
| 5,483,261 | A | 1/1996 | Yasutake |
| 5,512,826 | A | 4/1996 | Hardy et al. |
| 5,528,263 | A | 6/1996 | Platzker |
| 5,982,352 | A | 11/1999 | Pryor |
| 6,008,798 | A | 12/1999 | Mato, Jr. |
| 6,057,845 | A | 5/2000 | Dupouy |
| 6,141,000 | A | 10/2000 | Martin |
| 6,215,477 | B1 | 4/2001 | Morrison |
| 6,232,957 | B1 | 5/2001 | Hinckley |
| 6,333,753 | B1 | 12/2001 | Hinckley |
| 6,335,722 | B1 | 1/2002 | Tani et al. |
| 6,335,724 | B1 | 1/2002 | Takekawa |
| 6,337,681 | B1 | 1/2002 | Martin |
| 6,352,351 | B1 | 3/2002 | Ogasahara |
| 6,384,809 | B1 | 5/2002 | Smith |
| 6,414,671 | B1 | 7/2002 | Gillespie |
| 6,421,042 | B1 | 7/2002 | Omura |
| 6,429,856 | B1 | 8/2002 | Omura |
| 6,504,532 | B1 | 1/2003 | Ogasahara |
| 6,518,959 | B1 | 2/2003 | Ito |
| 6,531,999 | B1 | 3/2003 | Trajkovic |
| 6,532,006 | B1 | 3/2003 | Takekawa |
| 6,563,491 | B1 | 5/2003 | Omura |
| 6,594,023 | B1 | 7/2003 | Omura |
| 6,608,619 | B2 | 8/2003 | Omura et al. |
| 6,636,635 | B2 | 10/2003 | Matsugu |
| 6,654,007 | B2 | 11/2003 | Ito |
| 6,723,929 | B2 | 4/2004 | Kent |
| 6,747,636 | B2 | 6/2004 | Martin |
| 6,764,185 | B1 | 7/2004 | Beardsley |
| 6,765,558 | B1 | 7/2004 | Dotson |
| 6,788,297 | B2 | 9/2004 | Itoh et al. |
| 6,791,700 | B2 | 9/2004 | Omura |
| 6,803,906 | B1 | 10/2004 | Morrison |
| 6,810,351 | B2 | 10/2004 | Katsurahira |
| 6,825,890 | B2 | 11/2004 | Matsufusa |
| 6,828,959 | B2 | 12/2004 | Takekawa |
| 6,888,536 | B2 | 5/2005 | Westerman |
| 6,922,642 | B2 | 7/2005 | Sullivan |
| 6,999,061 | B2 | 2/2006 | Hara et al. |
| 7,339,580 | B2 | 3/2008 | Westerman et al. |
| 7,474,296 | B2 | 1/2009 | Obermeyer et al. |
| 7,743,348 | B2 * | 6/2010 | Robbins et al. ............... 715/863 |
| 2001/0019325 | A1 | 9/2001 | Takekawa |
| 2001/0022579 | A1 | 9/2001 | Hirabayashi |
| 2001/0026268 | A1 | 10/2001 | Ito |
| 2002/0036617 | A1 | 3/2002 | Pryor |
| 2002/0185981 | A1 | 12/2002 | Dietz |
| 2003/0001825 | A1 | 1/2003 | Omura et al. |
| 2003/0063775 | A1 | 4/2003 | Rafii et al. |
| 2003/0137494 | A1 | 7/2003 | Tulbert |
| 2003/0231167 | A1 | 12/2003 | Leung |
| 2004/0046744 | A1 | 3/2004 | Rafii et al. |
| 2005/0052427 | A1 | 3/2005 | Wu et al. |
| 2006/0022955 | A1 | 2/2006 | Kennedy |
| 2006/0026521 | A1 | 2/2006 | Hotelling et al. |
| 2006/0026536 | A1 | 2/2006 | Hotelling et al. |
| 2007/0252821 | A1 | 11/2007 | Hollemans et al. |
| 2007/0268273 | A1 | 11/2007 | Westerman et al. |
| 2008/0211785 | A1 | 9/2008 | Hotelling et al. |

FOREIGN PATENT DOCUMENTS

| | | |
|---|---|---|
| EP | 0881592 B2 | 12/1998 |
| JP | 2001/175807 | 6/2001 |

OTHER PUBLICATIONS

DiamondTouch Applications—Essenther, Frolines, Ryall, Shipman Diamond Touch for Multi-User Multi-Touch Applications—ACM Conference on Computer Supported Cooperative Work Nov. 2002 (CSCW 2002, TR2002-048).

NCSA (National Center for Supercomputing Applications) GM Slab Console—Johnson and Curtis Univ. Of Illinois , 2003.

NCSA (National Center for Supercomputing Applications) GM Slab Function—Johnson and Curtis Univ. Of Illinois , 2003.

Smart Board™ for Flat Panel Displays (Interactive Overlay)—Smart Technologies Inc. , 2003.

SmartSkin: An Infrastructure for Freehand Manipulation on Interactive Surfaces—J. Rekimoto, Interaction Laboratory Sony Computer Science Laboratories, Inc. 2002.

The Laser Wall—Paradiso and Strickon—Media Lab 1997.

TechoOnLine—Touchscreens Provide a Robust and Intuitive User Interface—ELO TouchSystems by Charles H. Small , 2002.

Multi-Finger and Whole Hand Gestural Interaction Techniques for Multi-User Tabletop Displays; ACM CHI Letters, 5(2); 193-202. ACM UIST 2003 Symposium on User Interface Software & Technology, Vancouver, Canada; Nov. 2003; pp. 193-202.

M. Wu, C. Shen, K. Ryall, C. Forlines, and R. Balakrishnan. (2006); Gesture Registration, Relaxation, and Reuse for Multi-Point Direct-Touch Surfaces; in Proceedings of IEEE Tabletop 2006 Conference on Horizontal Interactive Human-Computer Systems, Adelaide, South Australia; 8 pages. M.Wu and R. Balakrishnan; (2003).

* cited by examiner

PAN

ZOOM

ROTATE

BOUNDING BOX GESTURE RECOGNITION ON A TOUCH DETECTING INTERACTIVE DISPLAY

CROSS REFERENCE TO RELATED APPLICATIONS

This application is a continuation of U.S. patent application Ser. No. 11/134,802, filed May 20, 2005, which claims the benefit of U.S. Provisional Application Ser. No. 60/647,343, filed Jan. 25, 2005; and U.S. patent application Ser. No. 10/913,105, filed Aug. 6, 2004, all of which are incorporated herein in their entirety by this reference thereto.

BACKGROUND

1. Technical Field

The invention relates to interactive displays. More particularly, the invention relates to a method and apparatus for determining user gestures to control a touch detecting, interactive display.

2. Description of the Prior Art

There are many situations in which one or more individuals interactively explore image-based data. For example, a team of paleontologists may wish to discuss an excavation plan for a remote dig site. To do so, they wish to explore in detail the geographic characteristics of the site as represented on digitized maps. In most laboratories, this requires the team either to huddle around a single workstation and view maps and images on a small display, or sit at separate workstations and converse by phone. The activity of exploring imagery is much more easily and effectively accomplished with the users surrounding a single large display. A particularly effective approach is a touch detecting, interactive display such as that disclosed in the related patent application entitled Touch Detecting Interactive Display, filed 2004, Aug. 6, Ser. No. 10/913,105. In such a system, an image is produced on a touch detecting display surface. A touch sensor determines the locations at which a user contacts the display surface, and based on the position and motions of these locations, user gestures are determined. The display is then updated based on the determined user gestures.

A wide variety of mechanisms are available for determining the locations at which a user contacts the touch sensor. Often, a grid-based approach is used in which measurements acquired on the perimeter of the touch sensor indicate a horizontal coordinate $x_1$ and a vertical coordinate $y_1$ for each contact location.

FIG. 1 shows a schematic diagram that shows a prior art infrared break-beam, grid-based touch sensor for determining the coordinates of two contact locations. The approach shown is similar to that disclosed in U.S. Pat. No. 3,478,220 to Milroy, U.S. Pat. No. 3,764,813 to Clement et al., U.S. Pat. No. 3,775,560 to Ebeling et al., and U.S. Pat. No. 3,860,754 to Johnson et al. These systems incorporate a series of horizontal and vertical beams generated by infrared LED's and a corresponding series of infrared sensors. In FIG. 1, a point of contact $C_1$ interrupts the beam of light passing from an emitter $E_{1x}$ to a sensor $S_{1x}$ and the beam of light passing from an emitter $E_{1y}$ to a sensor $S_{1y}$. A similar interruption of beams is created by a contact point $C_2$. The locations of the contact points $(x_1,y_1)$ and $(x_2,y_2)$ are determined by considering the x and y locations of the interrupted beams. A well known shortcoming of this approach to determining contact locations is a ghosting effect in which the pair of contact locations $C_1$ and $C_2$ cannot be distinguished from the pair of contact locations $C_{1'}$ and $C_{2'}$. Accordingly, the contact information returned by grid-based touch sensor is best considered as a bounding box defined by the rectangle $C_1C_{1'}C_2C_{2'}$.

This method of determining and reporting the locations of contacts differentiates grid-based sensors from many other touch sensor technologies such as the Synaptics TouchPad™ found on many laptop computers. By measuring changes in capacitance near a wire mesh, the TouchPad™ determines contact positions directly and reports an absolute position to the host device. Clearly, an ability to directly ascertain and report the position of a contact is in many situations advantageous. However, capacitive sensors do not scale well, and are therefore impractical or prohibitively expensive for incorporation into large interactive displays.

A number of methods have been proposed for recognizing user gestures through tracking the position and motion of one or more contact locations determined by a touch sensor. Clearly, these methods encounter difficulty when used in conjunction with a grid-based sensor that cannot disambiguate the location of multiple simultaneous contact points. It would thus be advantageous to define a set of user gestures in terms of the bounding box surrounding the detected contact locations. Such a set of user gestures would permit the use of inexpensive, highly reliable, and highly scalable grid-based touch sensors yet still allow users to interact with the display in an intuitive manner.

SUMMARY

The invention provides a method and apparatus for identifying gestures performed by a user to control an interactive display. The gestures are identified based on a bounding box enclosing the points at which a user contacts a touch sensor corresponding with the display surface. The invention thus permits the use of inexpensive and highly reliable grid-based touch sensors that provide a bounding box to describe contact information. In identifying the gestures, the position, motion, shape, and deformation of the bounding box may all be considered. In particular, the center, width, height, aspect ratio, length of the diagonal, and orientation of the diagonal of the bounding box may be determined. A stretch factor, defined as the maximum of the ratio of the height of the bounding box to the width of the bounding box and the ratio of the width of the bounding box to the height of the bounding box, may also be computed. Finally, gestures may be identified based on the changes in time of these characteristics and quantities.

Gestures that may be identified include pan, zoom, and rotate gestures. Display commands that may be associated with the identified gestures include, panning, zooming, and rotation commands that, when executed, provide a translation, a change in the magnification, or a change in the orientation of the displayed imagery. In a preferred embodiment of the invention, a pan gesture is identified only if the motion of the bounding box is greater than a predetermined motion threshold and the deformation of the bounding box is less than a predetermined deformation threshold. A zoom gesture is identified only if the stretch factor is greater than a predetermined stretch threshold and is increasing. A rotate gesture is identified only if the deformation of the bounding box is greater than a predetermined deformation threshold. Ambiguity in the direction of rotation implied by a rotate gesture is resolved by a convention in which the bounding box is specified with a particular pair of opposing corners, e.g. lower left and upper right, determining the relative intensity of contact locations, or measuring the torque applied by the user to the display surface.

DETAILED DESCRIPTION

The invention provides a method and apparatus for identifying gestures performed by a user to control an interactive display. The gestures are identified based on a bounding box enclosing the points at which a user contacts a touch sensor corresponding with the display surface. The invention thus permits the use of inexpensive and highly reliable grid-based touch sensors that provide a bounding box to describe contact information.

Figure 2:
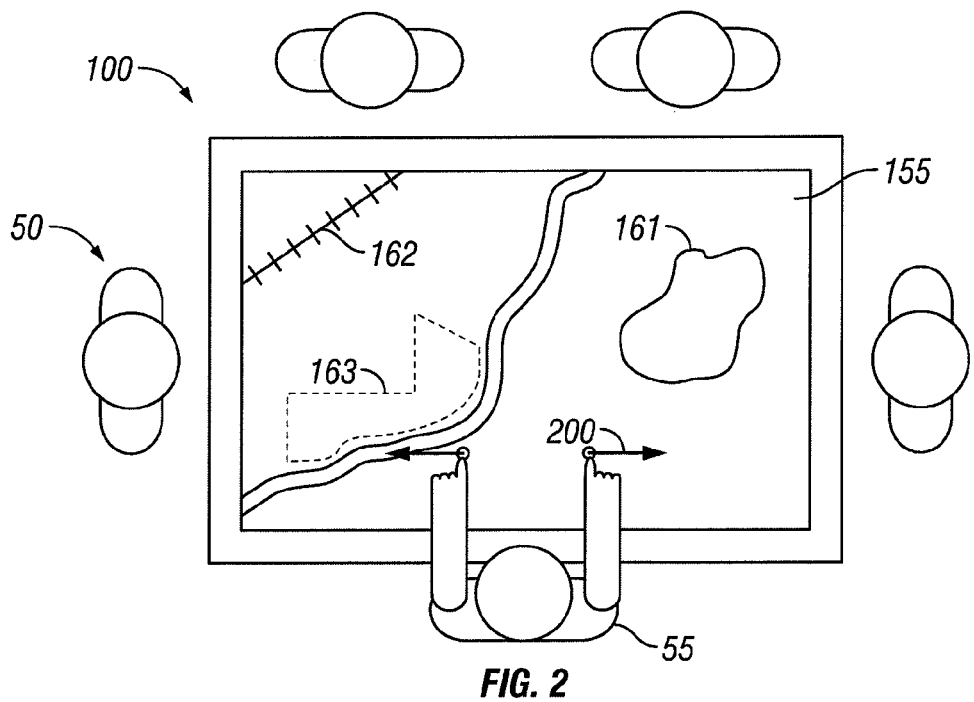
FIG. 2 shows is a schematic diagram that shows several users operating an exemplary interactive display in which the invention may be used.

FIG. 2 shows a schematic diagram that shows several users operating an exemplary interactive display in which the invention may be used. The users 50 surround the display 100 such that each can view the display surface 150, which shows imagery of interest to the users. For example, the display may present Geographic Information System (GIS) imagery characterized by geographic 161, economic 162, political 163, and other features, organized into one or more imagery layers. Because the users can comfortably surround and view the display, group discussion and interaction with the display is readily facilitated.

Corresponding to the display surface is a touch sensor 155 that is capable of detecting when and where a user touches the display surface. Based upon the contact information provided by the touch sensor, user gestures are identified, and a command associated with the user gesture is determined. The command is executed, altering the displayed imagery in the manner requested by the user via the gesture. For example, in FIG. 2, a user 55 gestures by placing his fingertips on the display surface and moving them in an outwardly separating manner. This particular gesture 200 is preferably associated with an inward zoom command. When the zoom command is executed, the display provides a closer, more detailed view of the displayed imagery.

In the preferred embodiment of the invention the touch sensor and the display are physically coincident as shown In FIG. 2. This may be achieved, for example, by projecting imagery onto a horizontal touch sensor with an overhead projector. However, in alternative embodiments of the invention, the touch sensor and display are physically separate.

Figure 1:
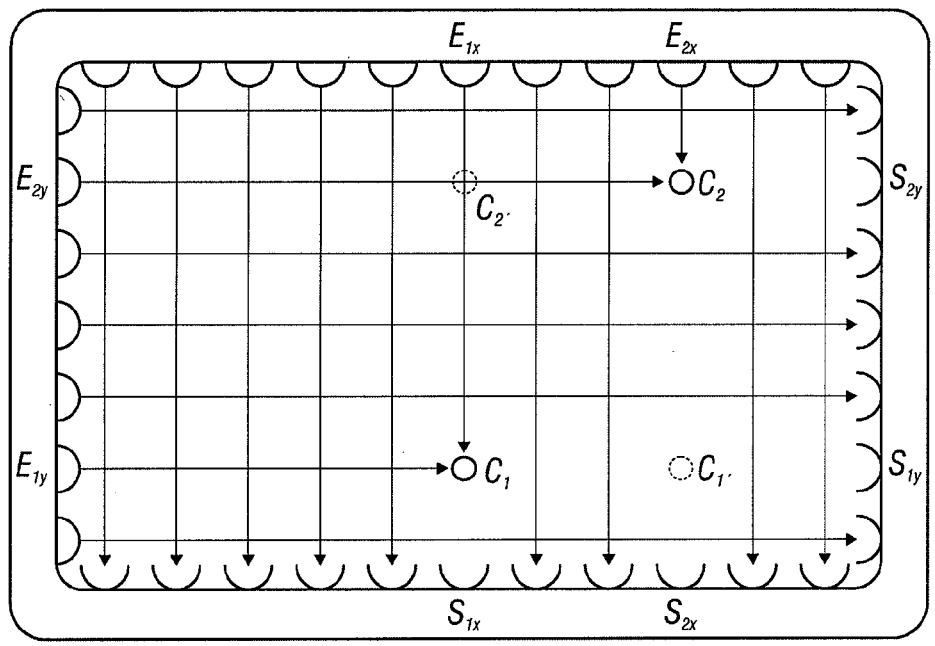
FIG. 1 shows is a schematic diagram that shows a prior art infrared break-beam, grid-based touch sensor for determining the coordinates of two contact locations.

As noted above, cost and reliability often motivate the use of a grid-based sensor in touch detecting displays that, as shown in FIG. 1, typically returns contact information in the form of a bounding box enclosing the detected contact locations. Defining a set of gestures in terms of the bounding box position, shape, motion, and deformation is therefore of great benefit.

Figure 3A:
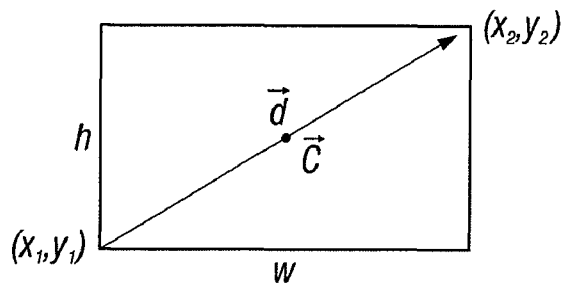
FIGS. 3a-3d shows several gestures identified based on bounding box position, shape, motion, and deformation according to the invention.

FIGS. 3a-3d show several gestures identified based on bounding box position, shape, motion, and deformation according to the invention. As shown in FIG. 3a, the contact information returned by the grid-based touch sensor is summarized by a bounding box described, by convention, by the coordinates of the lower left $(x_1,y_1)$ and upper right $(x_2,y_2)$ corners of the bounding box. The invention uses this information to identify the user gestures. Generally, gestures may be identified based on any of the center, aspect ratio, diagonal, length of the diagonal, and orientation of the diagonal of the bounding box. Gestures may also be identified based on the changes over time of any of these quantities.

Figure 3B:
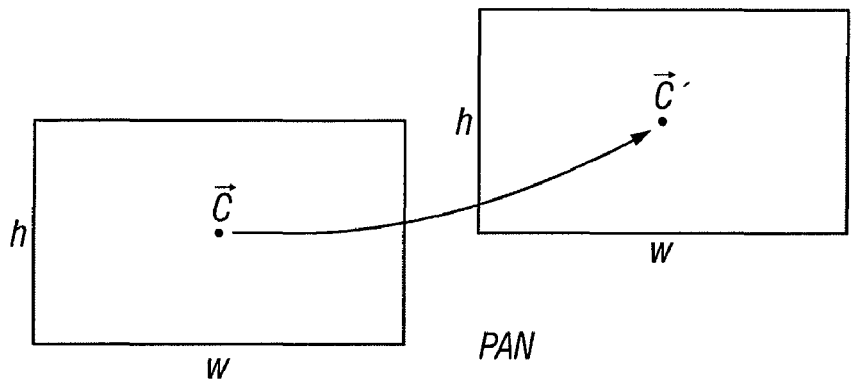
Figure 3C:
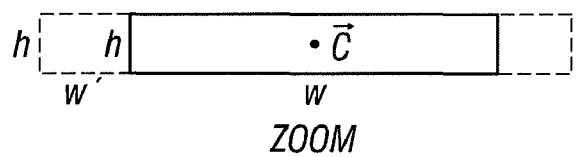
Figure 3D:
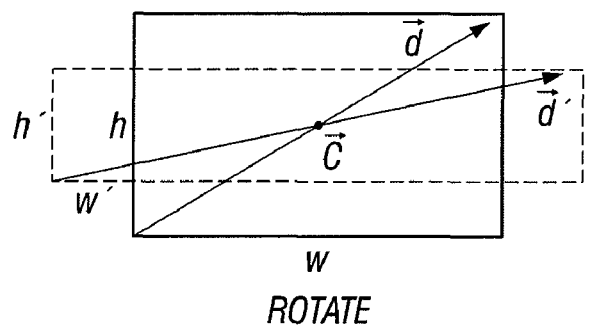

In the preferred embodiment of the invention, gestures are identified using the procedure detailed below and illustrated in FIGS. 3b-3d. Upon receipt of a bounding box from the touch sensor:

1. The bounding box width w, height h, center $\vec{C}$, and diagonal $\vec{d}$, are determined based on the corners of the bounding box.
2. The aspect ratio of the bounding box $$A = \frac{h}{w}$$

and the stretch factor of the bounding box $$S = \max\left[A, \frac{1}{A}\right]$$

are determined.

3. The rate of change of each of these parameters is determined based on a history of each parameter. More specifically, $\dot{w}$, $\dot{h}$, $\dot{\vec{C}}$, and $\dot{\vec{d}}$ are determined, where $\dot{Q}$ denotes the first derivative with respect to time of the quantity Q. The time derivatives may be computed using one or more of the previous parameter values, that is, using first or higher order derivative approximations.
4. The rate of change of the minimum and maximum of the length and width $$\frac{d}{dt}(\min[w, h]) \text{ and } \frac{d}{dt}(\max[w, h])$$

are determined. The time derivatives may be computed using one or more of the previous parameter values, that is, using first or higher order derivative approximations.

5. Then,

If $\dot{w}<\epsilon_l$, $\dot{h}<\epsilon_l$, and $|\dot{\vec{C}}|\geq\epsilon_c$, that is, if the bounding box is moved significantly but not deformed significantly, a pan gesture is identified.

If $$S > 1 + \varepsilon_S, \left|\frac{d}{dt}(\min[w, h])\right| < \varepsilon_l, \text{ and } \left|\frac{d}{dt}(\max[w, h])\right| \geq \varepsilon_l,$$

that is, if a stretch factor of an already stretched bounding box is increased or decreased significantly, a zoom gesture is identified.

If $|\dot{w}|\geq\epsilon_l$, $|\dot{h}|\geq\epsilon_l$, and $|\dot{\vec{C}}|<\epsilon_c$, that is, if the bounding box is deformed significantly but not moved significantly, a rotate gesture is identified.

Else, no gesture is identified.

$\epsilon_l$ and $\epsilon_c$ are predetermined thresholds corresponding to the ability of a typical user to hold the corresponding bounding box parameter constant while executing a gesture. $\epsilon_S$ is a minimum stretch factor above which gestures may be considered an inward or outward zoom. The values of the thresholds may be adjusted to yield a desired gesture classification behavior.

After a gesture is identified, a display command consistent with the identified gesture is determined, and the display is updated appropriately. In the preferred embodiment of the invention:

If a pan gesture is identified, the display is translated at constant magnification and orientation in the direction of $\dot{\vec{C}}$ at a rate proportional to $|\dot{\vec{C}}|$;

If a zoom gesture is identified, the magnification of the display is increased or decreased about the center of the display at a rate proportional to $$\left|\frac{d}{dt}(\max[w, h])\right|.$$

Alternatively, the display the magnification of the display may be changed about the current bounding box center $\vec{C}$; and If a rotate gestures is identified, the display is rotated about the center of the display at a rate proportional to $$\frac{d}{dt}(L\vec{d}).$$

Preferably, the display is rotated about its center. Alternatively, the display may be rotated about the current bounding box center $\vec{C}$.

In the preferred embodiment of the invention, the identification procedure is performed upon or shortly after initiation of contact by the user. Once the gesture has been identified, the identification is maintained until the contact is terminated. Throughout the duration of the contact, the display is continually updated, preferably each time updated bounding box information is received from the touch sensor. Initiation and termination of the single gesture are therefore determined based upon the appearance and disappearance of the bounding box, which is typically an event explicitly declared by the touch sensor.

Experimentation has indicated that such a rigid gesture classification is preferred by users, because it is difficult in practice to execute gestures that are purely of one type. Classifying the bounding box motion and deformation as a gesture of one type averts the frustration experienced by a user when, for example, an attempt to zoom results in both a zooming and a rotating motion of the display.

Nonetheless, in an alternative embodiment of the invention, the identification procedure is performed more frequently. For example, the identification procedure may be performed each time updated bounding box information is received from the touch sensor. In this approach, a single user motion, as delineated by the appearance and disappearance of a bounding box, potentially contains pan, zoom, and rotate gestures. Over the duration of the gesture, the display is updated with a combination of panning, zooming, and rotational motions that, to the user, appear smooth and continuous. Successful implementation of this embodiment requires especially careful selection of the thresholds $\epsilon_I$, $\epsilon_c$, and $\epsilon_S$.

In the above gesture identification procedure, the gesture for rotation remains partly ambiguous. Specifically, the direction of rotation cannot be determined from the bounding box alone. The pairs of points $[C_1,C_2]$ and $[C_1C_2{}']$ of FIG. 1 that possibly define the bounding box result in opposite directions of rotation. This ambiguity may be addressed through a number of approaches. In one approach, users adopt a convention of designating the bounding box with the lower left and upper right corners, or the upper left and lower right corners. In another approach, the gesture identification procedure assumes a single direction of rotation, regardless of the actual points of contact. In yet another approach, the ghosting effect of FIG. 1 may be truly disambiguated. In the case of grid-based sensors, for example, the true points of contact typically provide a stronger signal than do the ghost points of contact. The relative strength of the pairs of points $[C_1,C_2]$ and $[C_1C_2{}']$ may be used to determine the true contacts and therefore the correct direction of rotation. Finally, a measurement of the torque applied to the display surface may be made to ascertain directly the direction of rotation implied by the user gesture.

It should be noted that although the invention is described above with reference to a bounding box defined by two contact locations, the bounding box may also be defined for the case of three or more contact points. For a set of contact points $C_i$ defined by contact locations $(x_i,y_i)$, the bounding box is defined by the corners $(\min[x_i],\min[y_i])$ and $(\max[x_i],\max[y_i])$.

While the description herein references a grid-based sensor incorporating a series of infrared emitters and receivers, the invention is equally applicable to other grid-based sensors. For example, the invention may be used with laser break-beam grids, resistive grids, capacitive grids, and arrays of acoustic, e.g. ultrasonic, emitters and microphones. The invention may also be used with non-grid-based sensors that return contact information in the form of a bounding box.

Finally, while the invention is described with reference to a rectangular bounding box, alternative embodiments of the invention may used non-rectangular bounding boxes. For example, a touch sensor incorporating corner based sensors that determine an angular bearing to each point of contact may return contact information in the form of a quadrilateral bounding box. The techniques described herein can be applied to a generalized quadrilateral bounding box with appropriate definition of a bounding box center, width, height, aspect ratio, and diagonal. The invention may thus be used in conjunction with sensors that are not strictly grid-based.

Although the invention is described herein with reference to several embodiments, including the preferred embodiment, one skilled in the art will readily appreciate that other applications may be substituted for those set forth herein without departing from the spirit and scope of the invention.

Accordingly, the invention should only be limited by the following Claims.

The invention claimed is:

1. In an interactive display, a method for identifying a specific user gesture comprising the steps of: displaying imagery on an imaging surface;

detecting a plurality of contact locations at which at least one user contacts a touch sensor to control said display;

responsive to a determination that a deformation of a bounding box enclosing at least two of said plurality of contacts locations exceeds a predetermined deformation threshold and responsive to a determination that a motion of said bounding box is less than a predetermined motion threshold, identifying said specific user gesture as a rotate gesture;

associating said specific user gesture with a display command; and executing said display command to alter the display of said imagery.

2. The method of claim 1, wherein a display command affects any of:

a translation of said imagery;
a change in magnification of said imagery; and
a change in orientation of said imagery.

3. The method of claim 1, further comprising the step of:
responsive to a determination that a motion of said bounding box exceeds said predetermined motion threshold and that deformation of said bounding box is less than said predetermined deformation threshold, identifying said specific user gesture as a pan command.

4. The method of claim 1, further comprising the step of:
responsive to a determination that a stretch factor of said bounding box exceeds a predetermined stretch threshold and responsive to a determination that said stretch factor is either increasing or decreasing, identifying said specific user gesture as a zoom gesture.

5. In an interactive display, a method for identifying a specific user gesture comprising the steps of:
displaying imagery on an imaging surface;
detecting a plurality of contact locations at which at least one user contacts a touch sensor to control said display;
responsive to a determination that a stretch factor of a bounding box surrounding at least two of said contact locations exceeds a predetermined stretch threshold and responsive to a determination that said stretch factor is either increasing or decreasing, identifying said specific user gesture as a zoom gesture;
associating said specific user gesture with a display command; and
executing said display command to alter the display of said imagery.

6. The method of claim 5, wherein a display command affects any of: a translation of said imagery;
a change in magnification of said imagery; and
a change in orientation of said imagery.

7. The method of claim 5, further comprising the step of:
responsive to a determination that a motion of said bounding box exceeds said predetermined motion threshold and that deformation of said bounding box is less than said predetermined deformation threshold, identifying said specific user gesture as a pan command.

8. In an interactive display, a method for identifying a specific user gesture comprising the steps of:
displaying imagery on an imaging surface;
detecting a plurality of contact locations at which at least one user contacts a touch sensor to control said display;
responsive to a determination that a motion of a bounding box enclosing at least two of said plurality of contact locations exceeds said predetermined motion threshold and that deformation of said bounding box is less than said predetermined deformation threshold, identifying said specific user gesture as a pan gesture;
responsive to a determination that a stretch factor of said bounding box exceeds a predetermined stretch threshold and responsive to a determination that said stretch factor is either increasing or decreasing, identifying said specific user gesture as a zoom gesture;
associating said specific user gesture with a display command; and
executing said display command to alter the display of said imagery.

9. The method of claim 8, wherein a display command affects any of:
a translation of said imagery;
a change in magnification of said imagery; and
a change in orientation of said imagery.

10. The method of claim 8, further comprising the step of:
responsive to a determination that a deformation of a bounding box enclosing at least two of said plurality of contacts locations exceeds a predetermined deformation threshold and responsive to a determination that a motion of said bounding box is less than a predetermined motion threshold, identifying said specific user gesture as a rotate gesture.

11. In an interactive display, a method for identifying a specific user gesture comprising the steps of:
displaying imagery on an imaging surface;
detecting a plurality of contact locations at which at least one user contacts a touch sensor to control said display;
responsive to a determination that a deformation of a bounding box enclosing at least two of said plurality of contacts locations exceeds a predetermined deformation threshold and responsive to a determination that a motion of said bounding box is less than a predetermined motion threshold, identifying said specific user gesture as a rotate gesture;
responsive to a determination that a motion of said bounding box exceeds said predetermined motion threshold and that deformation of said bounding box is less than said predetermined deformation threshold, identifying said specific user gesture as a pan gesture;
responsive to a determination that a stretch factor of said bounding box exceeds a predetermined stretch threshold and responsive to a determination that said stretch factor is either increasing or decreasing, identifying said specific user gesture as a zoom gesture;
associating said specific user gesture with a display command; and
executing said display command to alter the display of said imagery.

12. An interactive display comprising:
means for displaying imagery on an imaging surface;
a touch sensor corresponding to said imaging surface;
means for detecting a plurality of contact locations at which at least one user contacts said touch sensor to control said display;
means for identifying a zoom gesture, comprising:
means for determining if a stretch factor of a bounding box surrounding at least two of said contact locations is greater than a predetermined stretch threshold; and
means for determining if said stretch factor is either increasing or decreasing;
means for associating said zoom gesture with a corresponding display command; and
means for executing said display command to alter the display of said imagery.

13. The display of claim 12, further comprising means for identifying a pan gesture, comprising:
means for determining if a motion of said bounding box is greater than a predetermined motion threshold;
means for determining if a deformation of said bounding box is less than a predetermined deformation threshold; and
means for associating said pan gesture with a corresponding display command.

14. The display of claim 12, further comprising means for identifying a rotate gesture, comprising:
means for determining if a deformation of said bounding box is greater than a predetermined deformation threshold;
means for determining if said motion of said bounding box is less than a predetermined threshold; and means for associating said rotate gesture with a corresponding display command.

15. An interactive display comprising:
means for displaying imagery on an imaging surface;
a touch sensor corresponding to said imaging surface;
means for detecting a plurality of contact locations at which at least one user contacts said touch sensor to control said display;
means for identifying a rotate gesture, comprising:
    means for determining if a deformation of a bounding box surrounding at least two of said contact locations is greater than a predetermined deformation threshold; and
    means for determining if said motion of said bounding box is less than a predetermined threshold;
    means for associating said rotate gesture with a corresponding display command; and
    means for executing said display command to alter the display of said imagery.

16. The display of claim 15, further comprising means for identifying a pan gesture, comprising:
means for determining if a motion of said bounding box is greater than a predetermined motion threshold;
means for determining if a deformation of said bounding box is less than a predetermined deformation threshold; and
means for associating said pan gesture with a corresponding display command.

17. The display of claim 15, further comprising means for identifying a zoom gesture comprising:
means for determining if a stretch factor of a bounding box surrounding at least two of said contact locations is greater than a predetermined stretch threshold;
means for determining if said stretch factor is either increasing or decreasing; and means for associating said zoom gesture with a corresponding display command.

18. An interactive display comprising:
means for displaying imagery on an imaging surface;
a touch sensor corresponding to said imaging surface;
means for detecting a plurality of contact locations at which at least one user contacts said touch sensor to control said display;
means for identifying a pan gesture, comprising:
    means for determining if a motion of a bounding box surrounding at least two of said contact locations is greater than a predetermined motion threshold; and
    means for determining if a deformation of said bounding box is less than a predetermined deformation threshold;
    means for associating said pan gesture with a corresponding display command; and
means for identifying a rotate gesture, comprising:
    means for determining if a deformation of said bounding box is greater than a predetermined deformation threshold;
    means for determining if said motion of said bounding box is less than a predetermined threshold;
    means for associating said rotate gesture with a corresponding display command; and
    means for executing said display commands to alter the display of said imagery.

19. The display of claim 18, further comprising means for identifying a zoom gesture comprising:
means for determining if a stretch factor of a bounding box surrounding at least two of said contact locations is greater than a predetermined stretch threshold;
means for determining if said stretch factor is either increasing or decreasing; and
means for associating said zoom gesture with a corresponding display command.

20. In an interactive display, a method for identifying a specific user gesture comprising the steps of:
displaying imagery on an imaging surface;
detecting a plurality of contact locations at which at least one user contacts a touch sensor to control said display;
responsive to a determination that a motion of a bounding box enclosing at least two of said plurality of contact locations exceeds said predetermined motion threshold and that deformation of said bounding box is less than said predetermined deformation threshold, identifying said specific user gesture as a pan gesture;
responsive to a determination that a deformation of a bounding box enclosing at least two of said plurality of contacts locations exceeds a predetermined deformation threshold and responsive to a determination that a motion of said bounding box is less than a predetermined motion threshold, identifying said specific user gesture as a rotate gesture;
associating said specific user gesture with a display command; and
executing said display command to alter the display of said imagery.

21. An interactive display comprising:
means for displaying imagery on an imaging surface;
a touch sensor corresponding to said imaging surface;
means for detecting a plurality of contact locations at which at least one user contacts said touch sensor to control said display;
means for identifying a pan gesture, comprising:
    means for determining if a motion of a bounding box surrounding at least two of said contact locations is greater than a predetermined motion threshold; and
    means for determining if a deformation of said bounding box is less than a predetermined deformation threshold;
    means for associating said pan gesture with a corresponding display command;
means for identifying a zoom gesture comprising:
    means for determining if a stretch factor of a bounding box surrounding at least two of said contact locations is greater than a predetermined stretch threshold;
    means for determining if said stretch factor is either increasing or decreasing;
    means for associating said zoom gesture with a corresponding display command; and
means for executing said display commands to alter the display of said imagery.

* * * * *